United States Patent

Zoellner et al.

[11] Patent Number: 5,566,465
[45] Date of Patent: Oct. 22, 1996

[54] STICK MATE/GAUGE STABILIZER

[76] Inventors: Carl W. Zoellner; John S. Ramsey, both of 9521 49th Pl., College Park, Md. 20740

[21] Appl. No.: 384,151

[22] Filed: Feb. 6, 1995

[51] Int. Cl.[6] .............................. G01B 3/00; G01F 23/04
[52] U.S. Cl. .................................. 33/723; 33/572
[58] Field of Search ................... 33/42, 572, 833, 33/484, 485, 489, 490, 491, 723, 726, 722, 730

[56] References Cited

U.S. PATENT DOCUMENTS

| | | | |
|---|---|---|---|
| 1,153,135 | 9/1915 | Rodeck | 33/833 |
| 1,199,103 | 9/1916 | Newmeyer | 33/722 |
| 1,220,212 | 3/1917 | Ferris | 33/484 |
| 2,154,148 | 4/1939 | Butts | 33/833 |
| 2,169,952 | 8/1939 | Holmes | 33/723 |
| 2,246,088 | 6/1941 | Clementz | 33/833 |
| 2,531,563 | 11/1950 | Feldheim | 33/371 |
| 2,607,122 | 8/1952 | Overmeyer et al. | 33/723 |
| 2,679,104 | 5/1954 | Whitton | 33/42 |
| 3,160,957 | 12/1964 | Phillips | 33/42 |
| 4,445,370 | 5/1984 | Whitmire | 33/723 |
| 4,481,770 | 6/1989 | Davies | 33/723 |

FOREIGN PATENT DOCUMENTS 870801   6/1961   United Kingdom ................. 33/723

*Primary Examiner*—Thomas B. Will
*Attorney, Agent, or Firm*—Robert Halper

[57] ABSTRACT

An assembly of a paint container, a sliding mixing gauge having graduations to indicate the quantities of ingredients to make a paint composition used for spray painting of vehicles and a slidable fastener for securing the gauge in the container and stabilizing its position when paint and other ingredients are poured into the container the mixing gauge being slidable removed from the fastener after measured quantities of ingredients have been added to mix the ingredients and at the end of a paint operation, the fastener is removed from the container and stored in a designated area.

3 Claims, 1 Drawing Sheet

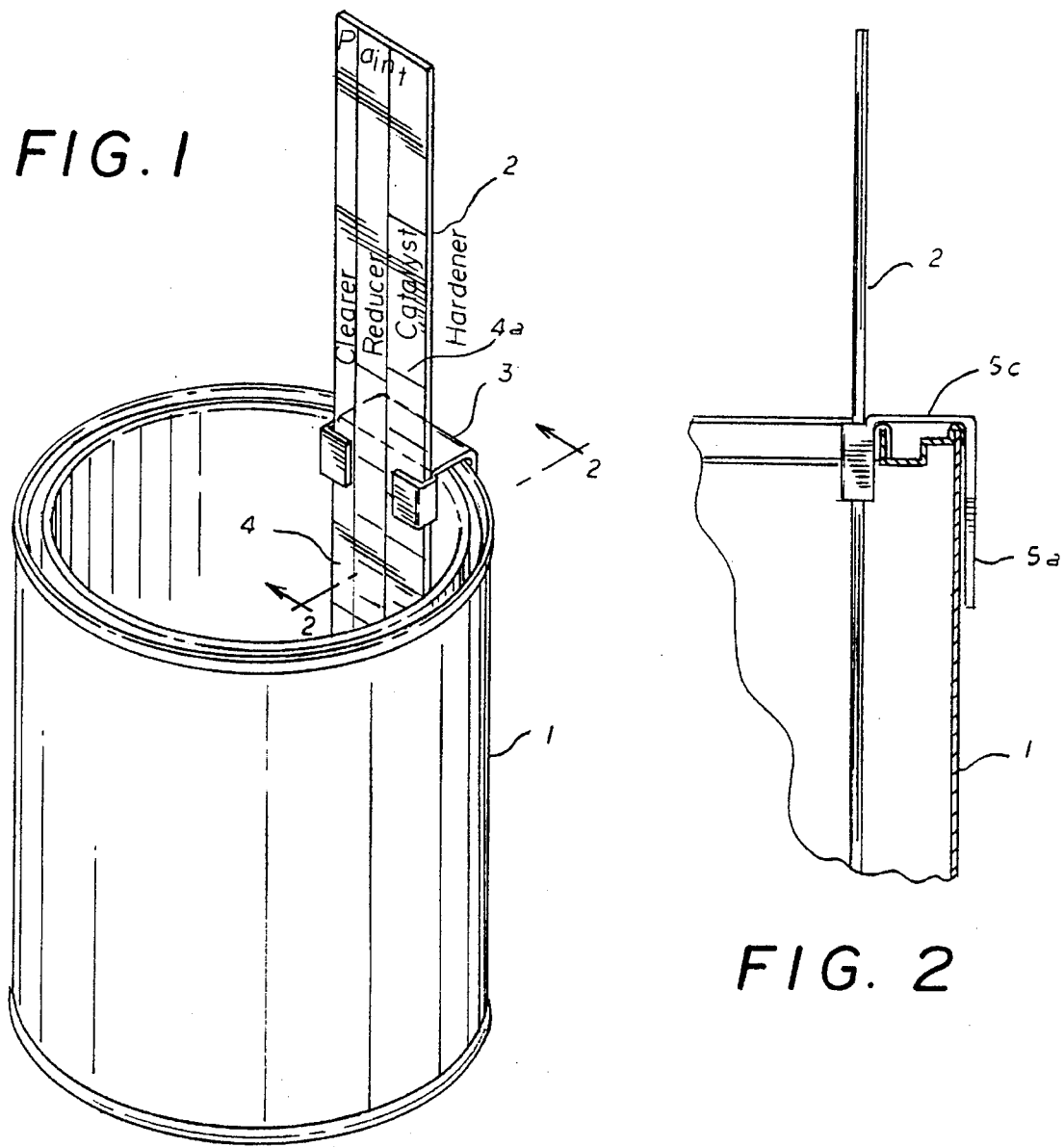
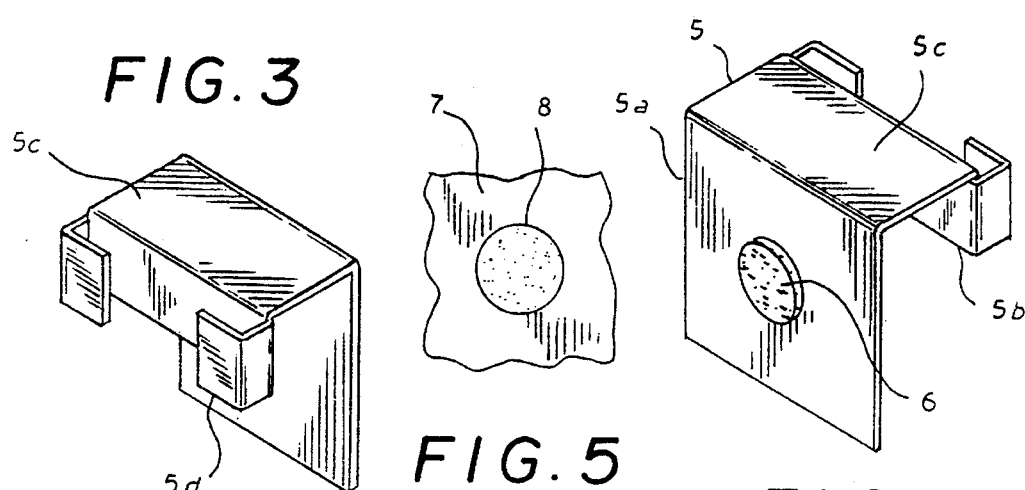

5,566,465

STICK MATE/GAUGE STABILIZER

FIELD OF INVENTION

This invention is in the field of painting, particularly related to spray painting of vehicles. Specifically it is concerned with a mixing gauge for paint wherein the gauge is stabilized in a paint container while ingredients to make a desired composition are added.

BACKGROUND OF THE INVENTION

A survey of the art reveals a number of containers and gauges or implements fastened to the containers, but none is directly concerned with a combination of a mixing gauge and paint container and a means for stabilization of the gauge in the container while ingredients to make the paint composition are being poured into the container.

U.S. Pat. No. 139,601 is concerned with a draftsman's ruling gauge and is cited to show the use of a longitudinally adjustable slide on the rule. The rule has two slidable edges which are grooved for engagement.

U.S. Pat. No. 2,027,494 teaches a mixing gauge for beverages. There is a receptacle which may be transparent in which the ingredients to be compounded are mixed. A gauge strip is divided into longitudinally extending columns. At the top of the gauge are indicia for each column representing the number of glasses of drinks to be made. Each column is further divided into sections wherein each section represents the amount of a particular ingredient to be added to make the desired drink. A container in the form of a flattened glass tube with a cover holds the gauge.

U.S. Pat. No. 2,373,338 represents a combination depth gauge and clip designed to be carried by the craftsman in his pocket. A triangular plate is designed to be laid on one face of the gauge to be slidable thereon. The forward edge forms the top and the side edges converge to form a pendent strip arched away from the base of the rule and curved with an outward point to form a pendent clip. To fasten the plate to the rule, its medial portion is struck back to form a sheath within which the rule passes. The sheath is stamped with an upward tongue tensioned against the rule to impart a suitable amount of friction for sliding movement of the plate.

U.S. Pat. No. 2,672,693 teaches a gauging attachment for tanks containing fluids. The purpose is to provide an attachment whereby the gauging may be so positioned that the measured distance from the gauging edge to the bottom of the tank is uniform for all tanks of the same capacities. A tank is provided with a gauging hatch and a measuring tape rests on the bottom of the tank. The attachment is a two piece clamp which encircles the hatch and is held in place by bolts. A separate clamp is fitted between the main clamp and is also bolted in position. A tube fits in this clamp and is held fast against vertical movement by its bolt. The tube can be vertically adjusted by loosening its bolt. A pipe runs through this tube and is vertically adjusted by a pair of set screws. A plate is fastened to the pipe adjacent its upper end and the upper edge of the plate, called the gauging edge is horizontal. This edge, is so adjusted that when a measurement is made with the tape, the reading will be uniform with other tanks of the same capacity.

U.S. Pat. No. 2,862,782 is drawn to a liquid level indicator for indicating level of a liquid in a tank. A transparent tube is mounted on and depends through an aperture in the wall of a tank. A light sensitive tape is in the form of a roll in a support member above the tank. The tape includes an integral tongue to which the tape is secured by a clip. A light source in the form of an UV lamp positioned in an adjacent descending tube is used to measure the level of bulk milk. When an indication of the liquid level is desired the light source is energized to expose the tape above the liquid level. The tube in which the tape is located has graduations on its exterior surface so that the number of units of milk present in the tank will be indicated.

U.S. Pat. No. 3,088,208 is a trouser length gauge. An elongated rule extends from a surface on which a person stands to the waist of the person to measure trouser fit. The rule is measured in inches and fractions thereof. An indicator is slidable mounted on the rule by enclosing the rule in a channel. The side of the indicator facing the numbers is transparent and is fastened to the other side of the indicator by screws. A spring is used to maintain the indicator in a given position and the spring has its ends bent to form hooks which grab the edges formed between the two pieces of the indicator to hold the spring in the indicator. The indicator has a pointer which is tapered to form a triangle wherein its horizontal surface comes to rest on the trouser whose height is to be measured.

U.S. Pat. No. 3,432,875 teaches a paint brush in combination with a paint can and a hanger for the brush in the can. The purpose is to keep the brush in a downward position when not in use to maintain the original shape of the brush. The handle and ferrule have aligned holes which are located in the broad face of the brush. A bushing passes through the hole. A hanger of sheet material has several spaced hooks which are spaced apart vertically and offset horizontally from one another. Projecting from the opposite side of the hooks is a finger. The bushing line hole in the brush passes over the finger so that the brush bristles are above the paint in the can and one of the hooks passes over the edge of the can and engages its outer edge while a lower one of the hooks stabilizes the hanger by abutting against the inner surface of the can.

It has been the custom in the industry to place a mixing gauge in a can and then pour paint followed by measured quantities of other ingredients. Heretofore, the mixing gauge has lain haphazardly in the can and when an ingredient has been poured into the can, the gauge has shifted its position. This not only interfered with pouring of the ingredients, but because of the loose and inclined position of the gauge, the gauge has become wetted past the designated marking for a particular ingredient. Accordingly when additional ingredients are added, it has been difficult to get a true and accurate reading of the designated mark.

An object of this invention is to secure the mixing gauge in the can so that when paint and other ingredients are poured into the can, the gauge will not obstruct the addition of the ingredients.

It is an other object of this invention to hold the gauge in a vertical position against the can so that an accurate reading of the gauge markings can be made.

Still another object of this invention is to be able to quickly and slidable remove the means to secure such means to the can and store the gauge in a readily accessible area.

It is also an object of this invention to slidable remove the gauge and use it to mix the ingredients that have been added to make the paint composition.

BRIEF DESCRIPTION OF THE DRAWING

FIG. 1 is an isometric view showing the complete assembly of can, mixing gauge and fastener.

FIG. 2 is a partial side elevation of the assembly.

FIG. 3 is a front isometric view of the fastener.

FIG. 4 is a rear isometric view of the fastener.

FIG. 5 is a front view showing a magnetic surface and a marker for the fastener when not in use.

SUMMARY OF THE INVENTION

The invention is directed to a sliding clip that enables a mixing gauge to be held vertically in a can without shifting when successive ingredients are poured. The clip secured to the outer surface of the can and hooked around the mixing gauge, prevents fortuitous movement and interference with pouring of the ingredients; moreover, it stabilizes the gauge so that once a measurement of a particular ingredient has been determined, the sequential additions of successive ingredients can also be accurately be measured, since on pouring the gauge will not tilt or turn and thus become wetted at points above the graduated marks.

DETAILED DESCRIPTION OF THE INVENTION

FIG. 1 shows the complete assembly of a paint can 1, a gauge 2 and a fastener 3 encircling the gauge and holding the same in a vertical position within the can. The gauge is slidable in the fastener about 13" long×1 and ⅛" wide. and on both sides the gauge is marked off into longitudinal segments 4 with different graduations 4a indicating the amount of specific ingredients to be added. Additionally in the upper region of the gauge along each segment, a description of the particular ingredient to be added is inscribed. For example in spray painting vehicles the operation is usually conducted in two steps. In the first step a paint, preferably a urethane paint to which thinner has been added is sprayed on the vehicle. After the paint has dried sufficiently, the vehicle is again sprayed with a mixture of cleaner and hardener, the latter composition giving the paint coating a secure and lustrous finish. The composition to be added in step 1 would comprise a paint added to the can to the indicated graduation on the gauge followed by thinner to the designated mark, whereupon the gauge is slidable removed from the fastener and is used to mix the paint composition which is then emptied into a spray gun. The operation is again repeated for the second composition of cleaner and hardener. The spray guns are of two types. One is known as a syphon type with the cup at the bottom and the other is referred to as the gravity fed type with the paint cup at the top.

The clip or fastener is made of light weight metal such as aluminum and comprises a channel having a long leg 5a, which is about 1 and 5/16" square and extends over the outer surface of the can and a shorter leg 5b about ⅜" in length and extends into the can and a channel web 5c about 9/16" that spans the can's outer and inner surfaces. Extending inwardly from the juncture of the web and the shorter leg are a pair of angle like hooks 5d. These hooks are integral with the shorter leg and each is located on a respective side thereof. The hooks are about ½" long and 3/16'×3/16" as viewed from the top. These hooks support the mixing gauge and prevent the gauge from being displaced upon addition of the various ingredients that make the paint composition. Bonded adhesively to the outer side of the longer leg of the channel is a disk type magnet 6, preferably of the ceramic type. The adhesive used could be any of the epoxy resins. The magnet serves as a keeper, that is, after the painting operation is completed, the clip is slidable removed and the mixing gauge is taken out of the can. The clip is then magnetically attached to a magnetically sensitive surface 7 which contains a marker 8 indicating the designated storage area for the clip when not in use.

In summation a simple means has been developed to solve a problem prevalent in hundreds of vehicular paint shops througout the country, namely stabilizing a mixing gauge in a container when a number of ingredient are to be added to make a paint composition.

While the invention has been described in its preferred embodiment various modifications could be made as would be obvious to those skilled in the art without departing from the scope of the invention as determined by the appended claims.

We claim:

1. An arrangement used to stabilize a mixing gauge in a container, said container having a bottom, an outer surface and an inner surface, a slidable mixing gauge and a fastener for securing said gauge to said container, said gauge being made of metal and marked off into longitudinal segments, each of said segments containing graduations to indicate the amount of ingredients to be added to make a desired composition, said gauge having an upper section that designates the name of the ingredient be added, said gauge being held securely in said container in a vertical position by said fastener, said fastener being of light weight metal and being in the form of a channel having a longer leg and a shorter leg and a web joining said legs, said longer leg extending downwardly over said outer surface, said shorter leg extending downwardly adjacent said inner surface of the container, a pair of equally dimensioned angle-like hooks integral with said shorter leg and each said hook located at a side of said shorter leg at the juncture of said shorter leg with said web, said hooks bent inwardly with respect to said inner surface of said container, a space being formed between said hooks and said shorter leg of said channel just sufficient to accommodate the insertion of said mixing gauge therein, said gauge extending to the bottom of said container, said mixing gauge being slidable removed from said fastener after said ingredients have been added and being used to mix said composition.

2. An arrangement as in claim 1 wherein said container is for receiving paint and additional measured quantities of ingredients to form a paint composition used for spraying paint on vehicles.

3. An arrangement as in claim 1 wherein a disk magnet is adhesively bonded to an external surface of said longer leg of said channel.

* * * * *